US011506565B2

(12) United States Patent
Falk et al.

(10) Patent No.: US 11,506,565 B2
(45) Date of Patent: Nov. 22, 2022

(54) FOUR-DIMENSIONAL CRANE RAIL MEASUREMENT

(71) Applicant: Falk PLI Engineering & Surveying, Inc., Portage, IN (US)

(72) Inventors: Michael O. Falk, Portage, IN (US); Sagar Deshpande, Big Rapids, MI (US); Zhengwei Davis Zhang, Burns Harbor, IN (US); Nathan Plooster, Michigan City, IN (US)

(73) Assignee: Falk PLI Engineering & Surveying, Inc., Portage, IN (US)

( * ) Notice: Subject to any disclaimer, the term of this patent is extended or adjusted under 35 U.S.C. 154(b) by 189 days.

(21) Appl. No.: 17/029,656

(22) Filed: Sep. 23, 2020

(65) Prior Publication Data

US 2021/0088407 A1    Mar. 25, 2021

Related U.S. Application Data

(60) Provisional application No. 62/904,824, filed on Sep. 24, 2019.

(51) Int. Cl.
| | |
|---|---|
| *G01M 5/00* | (2006.01) |
| *B66C 15/00* | (2006.01) |
| *B66C 13/16* | (2006.01) |

(52) U.S. Cl.
CPC ............ *G01M 5/0091* (2013.01); *B66C 13/16* (2013.01); *B66C 15/00* (2013.01); *G01M 5/0025* (2013.01)

(58) Field of Classification Search
CPC ............. G01M 5/0091; G01M 5/0025; G01M 5/0041; B66C 13/16; B66C 15/00
See application file for complete search history.

(56) References Cited

U.S. PATENT DOCUMENTS

| | | | |
|---|---|---|---|
| 3,123,330 A | | 3/1964 | Forbes-Robinson |
| 4,454,818 A | * | 6/1984 | Eccleston ................. E04G 3/22 |
| | | | 212/346 |
| 5,419,521 A | | 5/1995 | Matthews |
| 5,963,749 A | | 10/1999 | Nicholson |
| 6,236,429 B1 | * | 5/2001 | Ho ..................... G01N 21/8901 |
| | | | 348/125 |
| 7,428,781 B2 | | 9/2008 | Wickhart |

(Continued)

FOREIGN PATENT DOCUMENTS

| | | | | |
|---|---|---|---|---|
| DE | 19933809 A1 | * | 2/2001 | ............... B66C 7/14 |
| EP | 186558 A | * | 7/1986 | ............... G21K 5/04 |

(Continued)

OTHER PUBLICATIONS

Machine translation of EP2910512B1 (Year: 2016).*

(Continued)

*Primary Examiner* — Melissa J Koval
*Assistant Examiner* — Sangkyung Lee
(74) *Attorney, Agent, or Firm* — Stradley Ronon Stevens & Young, LLP

(57) ABSTRACT

A method and system for conducting a non-contact survey of an overhead crane runway system using a survey apparatus that is alternately located in the crane bay or on a crane bridge girder. Disclosed more particularly are a method and system for testing an overhead crane runway beam 3D alignment or an overhead crane runway rail 3D alignment using a 3D laser scanner.

31 Claims, 11 Drawing Sheets

(56) References Cited

U.S. PATENT DOCUMENTS

| | | | |
|---|---|---|---|
| 7,561,990 | B2 | 7/2009 | Lewis et al. |
| 7,774,381 | B2 | 8/2010 | Kothuri et al. |
| 7,804,498 | B1 * | 9/2010 | Graham ............... G06T 11/206 345/419 |
| 8,314,390 | B2 | 11/2012 | Micko |
| 8,354,643 | B2 | 1/2013 | Micko |
| 8,393,214 | B2 | 3/2013 | Ruile et al. |
| 8,410,774 | B2 | 4/2013 | Yang et al. |
| 8,416,094 | B2 | 4/2013 | Dery et al. |
| 8,631,701 | B2 | 1/2014 | Chiba et al. |
| 8,793,107 | B2 * | 7/2014 | Miller .................... G06T 17/05 703/2 |
| 8,854,544 | B2 | 10/2014 | Wong |
| 8,938,160 | B2 | 1/2015 | Wang |
| 9,534,730 | B2 | 1/2017 | Black et al. |
| 9,726,516 | B2 | 8/2017 | Carbone et al. |
| 9,784,579 | B2 | 10/2017 | Sunio et al. |
| 9,789,393 | B2 | 10/2017 | Adachi et al. |
| 9,863,767 | B2 | 1/2018 | Fuchikami et al. |
| 9,900,669 | B2 | 2/2018 | Touma et al. |
| 9,983,025 | B2 | 5/2018 | Zuta et al. |
| 10,157,535 | B1 | 12/2018 | Martinez |
| 10,257,499 | B2 | 4/2019 | Hintz et al. |
| 10,315,781 | B2 | 6/2019 | Zhao et al. |
| 2005/0111012 | A1 | 5/2005 | Waisanen |
| 2007/0171434 | A1 * | 7/2007 | Wickhart ................. B66C 7/00 701/19 |
| 2012/0033069 | A1 * | 2/2012 | Becker .................... G01S 17/42 345/592 |
| 2012/0224056 | A1 * | 9/2012 | Sunio .................... G05D 1/0282 702/85 |
| 2014/0088415 | A1 * | 3/2014 | Hielscher ............ A61B 5/0082 600/425 |

FOREIGN PATENT DOCUMENTS

| | | | | |
|---|---|---|---|---|
| EP | 2499454 | | 9/2012 | |
| EP | 2910512 | A1 * | 8/2015 | ............ B66C 13/46 |
| JP | 2869741 | B2 * | 3/1999 | |
| JP | 2014215296 | A * | 11/2014 | ............ G01C 21/12 |
| WO | WO-2019008914 | A1 * | 1/2019 | ............ B66C 13/08 |

OTHER PUBLICATIONS

Machine translation of JP2869741B2 (Year: 1999).*
Machine translation of JP2014215296A (Year: 2014).*
Machine translation of DE19933809A1 (Year: 2001).*
Machine translation of EP1806558A1 (Year: 2001).*
Machine translation of WO 2019008914A1 (Year: 2019).*
Comprehensive and Highly Accurate Measurements of Crane Runways, Profiles and Fastenings (Year: 2017).*
Anonymous, "Aligning overhead crane rails", Hoist Magazine, 2008, http://www.hoistmagazine.com/features/aligning-overhead-crane-rails/.
Anonymous, "Schematic view of a crane runway rail", 2018, originally published at http://www.rapidrail.co.uk/images/tracktolerancediagramSmall.gif; link no longer active.
Arbi et al., "The Application of Terrestrial Laser Scanner Surveys for Detailed Inspection of Bridges", 7th Australian Small Bridge Conference, 2015, Melbourne, Victoria, pp. 1-12.
Dearborn Crane, "Crucial Dimensions", 2007, http://www.dearborncrane.eom/pdf/bridge_cranes/107-Crucial%20Dimensions.pdf.
Demag, "Safety all along the line", 2017, https://www.demagcranes.com/sites/default/files/media/documents/21308444_EN_DE_170831_2.pdf.
Judy, "Spreading Cracks on FIU Bridge Failed to Alarm Project Team", ENR Southeast, 2019, pp. 1-6.
Kremen et al., "Checking Crane Rails by Terrestrial Laser Scanning Technology", LNEC, Lisbon, 2008, pp. 1-10.
Miarjetic et al., "An Alternative Approach to Control Measurements of Crane Rails", Sensors, 2012, 12, pp. 5906-5918.
Neumann et al., "Crane rail surveys keep the wheels turning*", World Cargo News, 2009, p. 20.
RAILQ, "Runway Survey", 2010, https://f.nordiskemedier.dk/20ihs75bstcbbjja.pdf.
Shortis et al., "Alignment of Crane Rails Using a Survey Network", Australian Surveyor, 1995,40(4), pp. 1-13.
Yan et al., "Automated Damage Detection and Structural Modeling with Laser Scanning", Proceedings of the Annual Stability Conference, 2016, Oriando, Florida, pp. 1-20.
Screen capture from vimeo clip entitled "AEC/RE Pitchathon 2020:Aren", 1 page, uploaded on Jun. 22, 2020 by the user "Shadow Ventures", Retrieved from Internet: <https://vimeo.com/431385830>.

* cited by examiner

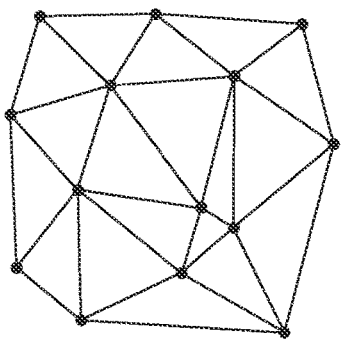
FIG. 3A
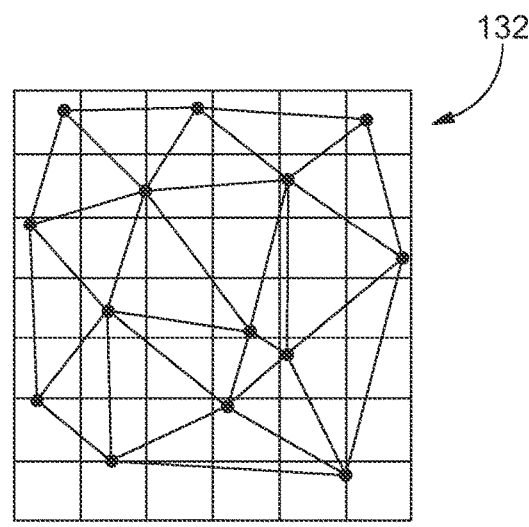
FIG. 3B
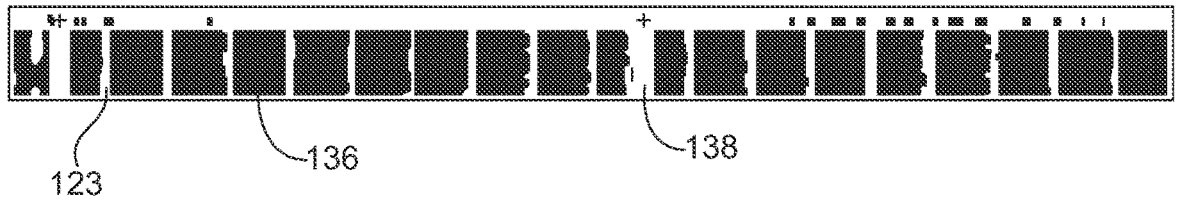
FIG. 4A
FIG. 4B

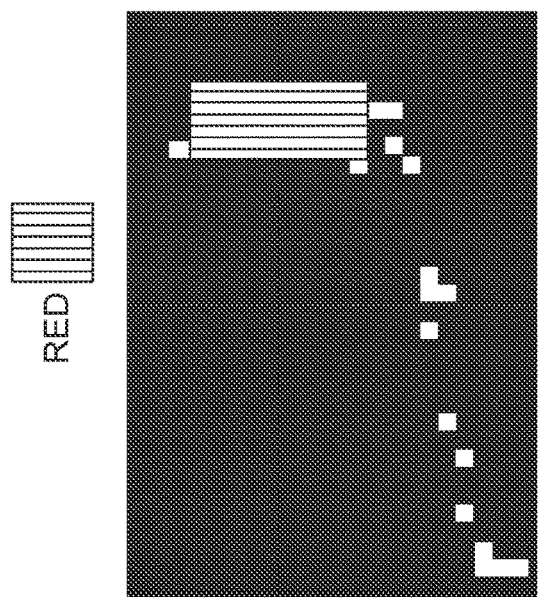
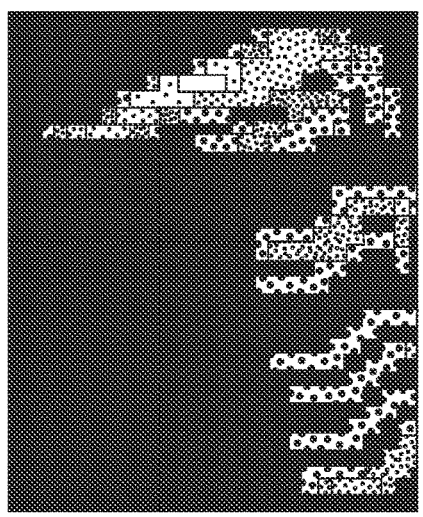
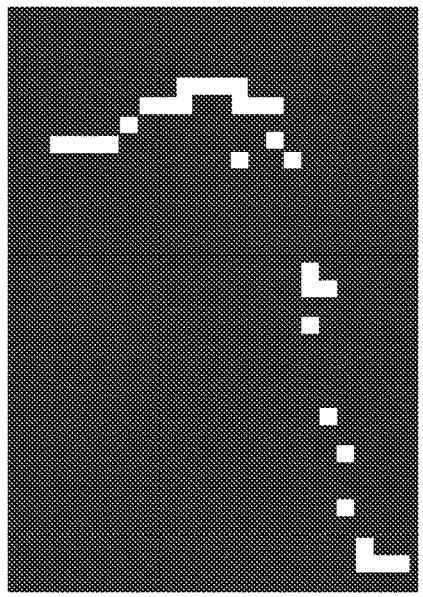
FIG. 8C
FIG. 8B
FIG. 8A

FOUR-DIMENSIONAL CRANE RAIL MEASUREMENT

RELATED APPLICATION

This application claims the benefit of priority to U.S. Patent Application No. 62/904,824 titled Four-Dimensional Crane Rail Measurement filed on Sep. 24, 2019, the contents of which are incorporated in this application by reference.

TECHNICAL FIELD

The present disclosure relates generally to a method and apparatus for conducting a non-contact overhead crane runway system survey using a survey apparatus that is alternately located in the crane bay or on a crane bridge girder, and, more particularly, to testing an overhead crane runway beam 3D alignment or an overhead crane runway rail 3D alignment using a 3D laser scanner. The data and profiles generated can be reviewed to ascertain whether the overhead rails conform to alignment specifications.

BACKGROUND OF THE DISCLOSURE

An exemplary overhead crane 100, with which exemplary embodiments of the described rail survey system and rail survey data collection methods can be used, is shown in FIG. 1A. The traveling overhead crane 100 may span a distance between two runway rails 101, each runway rail 101 supported by a runway beam 102, and each runway beam 102 supported by a plurality of support columns (not shown). The runway beam 102 generally has an "I" shape as shown in FIG. 1B, with an upper flange 120 upon which the runway rail 101 rests and a lower flange 121 connected to the upper flange 120 via a web 122. The runway beam 102 can be further reinforced with a plurality of stiffeners 123 that are positioned between the upper flange 120 and the lower flange 121 of the runway beam 102 in a plane that is perpendicular to both the flanges 120, 121 and the web 122 and placed at intervals along the runway rail 101.

The overhead crane 100 contacts each of the runway rails 101 with an end carriage 103. Each end carriage 103 includes two or more crane wheels 104 that contact the runway rail 101. For example, each end carriage 103 shown in FIG. 1A includes two crane wheels 104. The leading and trailing ends of each end carriage 103 terminate with a rail sweep 105.

The overhead crane 100 further includes a trolley 106 that receives power through a trolley festoon 116 and travels between the two respective end carriages 103 on a pair of bridge rails 107. Each bridge rail 107 is supported by a bridge girder 108. The bridge girder 108 is driven by a crane motor 118 along the runway rails 101. The trolley 106 may further include one or more hoisting mechanisms 109, each supporting a load hook 110 through a wire rope 115, which can be raised and lowered by each of the respective hoisting mechanisms 109 to raise and lower cargo. Use of the hoisting mechanisms 109 to raise and lower cargo, in combination both with the ability of the trolley 106 to travel back and forth between the two respective end carriages 103 on the bridge rails 107 and with the ability of the overhead crane 100 (as a whole) to travel the length of the crane rails 101, allows crane operators to move cargo between any two locations on the loading dock between the crane rails 101. Operation of the overhead crane 100 can be controlled by a crane operator via a push button pendant 111 connected to a pedant festoon 112 by a pendant cable 113 or, alternatively, via a remote control 114. The pedant festoon 112 and the trolley festoon 116 are slidably suspended from a C-Track 117 positioned along the bridge girder 108. The crane motor 118 is powered through a high TRO reel system 119, which is a type of industrial mobile power feeding system.

Overhead cranes, such as the overhead crane 100 described above, are used in material handling factories and warehouses around the world to load and unload millions of tons of cargo daily and are crucial to the daily operations performed at each of these respective factories and warehouses. Due to the large scale of such overhead cranes and the heavy loads typically transported by the cranes, proper alignment of runway rails and crane wheels is crucial to their safe and efficient operation, and hence crucial to the daily operations of each business in which they are used. Changes to geometric parameters stated in the project documentation arise not only during installation, but especially during operation of the crane. These changes are caused by various influences such as forces affecting the crane when the crane is moving, crane weight, material depreciation, heat influences, and more.

Alignment standards for crane rails are outlined in the Crane Manufacturers Association of America's specification 70 and AISE technical report #13. Many types of rail surveys involve time-consuming methods that require the rail to be locked out (i.e., power to the hot rail turned off) and survey personnel to walk the length of the runway.

Although alignment of the runway rails is important, other factors, such as positioning of the crane wheels parallel to their respective runway rails and/or assuring that drive motor output provided to the respective end carriages is equivalent, are also important. Imbalances in motor output to the respective end carriages can cause crane skew even though the runway rails themselves are within tolerance guidelines. These imbalances result in wear on the rails and crane wheels, both of which are costly to repair. Hence, a safe method to quickly and accurately collect rail survey data and to find the root cause of misalignment problems would be very beneficial.

Previous methods of rail surveying have involved using piano wire for straightening sections of rail. When used in conjunction with a tape measure to measure the span between runway rails, this method is not very accurate and is extremely time consuming. Another common method requires setting a transit on the rail while survey personnel walk the length of the rail, stopping at various points to take readings. Although this is a more accurate approach for determining the straightness of individual runway rails, determining the span between runway rails is still dependent on the use of a tape measure. For measurement of runway rail elevation, yet another instrument is required for set-up on the rail. With few exceptions, the known methods for rail surveying refer primarily to techniques for use on train tracks and elevation tracks which are not applicable for use with respect to overhead cranes.

An alternative method is described in U.S. Patent Application Publication No. 2005/0111012 and uses a remotely operated laser to perform a runway survey. This device is not configured, however, to measure the relative positioning of the two rails that support the crane bridge girder (e.g., span alignment or elevation). In addition, the existing alignment systems require manpower to access the crane rail runway beam and begin taking measurements on one side of the bay, work their way to the end of the bay, then do the same thing on the other side of the bay. The rail span value is geometrically calculated and is never directly measured. These methods thus result in suspension of crane operation for the duration of the survey, which translates into increased costs and fiscal and efficiency losses.

Overhead cranes are often the heart of operations in a manufacturing facility. Shutting down an overhead crane can and often does shut down operations. Therefore, operators are reluctant to shut down cranes for maintenance or inspections. The problem becomes how operators can maintain and inspect overhead cranes with minimal or, preferably, no downtime. Accordingly, there is a need for a method of surveying rails of overhead cranes which does not require suspension of crane operation.

Existing rail survey systems require down time and human access to the crane rail. In the past, operators would survey, analyze, and repair crane rails during the same outage period. This practice makes the engineering analysis and design repair the scheduling choke point. Prior methods also limited the ability of operators to seek and vet competitive bids from contractors for the repairs; they also limited the material available to use during the outage.

To overcome the shortcomings of existing rail survey systems, a contact-free rail survey system is provided. An object of the present disclosure is to provide a more efficient approach to surveying the rail alignment of an overhead crane. A related object is to eliminate the need for access to the crane runway rails to complete an alignment survey. Another object is to eliminate or significantly shorten the outage period required to complete the survey. Yet another object is to safely, quickly, and accurately measure crane runway rail, runway beam, runway beam flange camber, runway beam web warp and lean, hot rail alignment, column 3D position and lean, column girder seats, and span during normal operations. A related object is to allow measurements to be taken months or weeks before the scheduled downtime, allowing sufficient time for engineering analysis, design, and competitive bidding for repair.

SUMMARY OF THE INVENTION

To achieve these and other objects, and in view of its purposes, the present disclosure provides a non-contact rail survey system for overhead crane runway beams, crane bridge beams, and structural beams used for bridges and the like. Each crane runway beam has an upper flange and a lower flange linked by a beam web, and a plurality of vertical beam web stiffeners positioned along the beam at intervals. A runway rail is positioned on top of the runway beam. A hot rail is positioned along the upper flange of the crane runway beam. Crane columns each have an upper end and a lower end, with the upper end having a beam seat upon which the crane runway beam rests. The system includes a measurement unit configured to remain stationary during measurement of two runway rails which collectively form a runway. The measuring unit includes a 3-D laser scanner configured to collect data, a support base, and an interface which transmits the data collected by the 3D laser scanner. The system further includes a computing unit with a receiver which receives the 3D laser scanner data transmitted by the interface, a data storage unit, and a processor configured to compute one or more of runway rail 3D alignment, crane runway beam 3D alignment, crane runway beam flange camber, crane runway beam web warp and lean, hot rail 3D alignment, crane column 3D position and lean, crane column beam seats, and direct span measurement.

The present disclosure further provides a non-contact method for measuring 3-D alignment of an overhead crane runway beam having an upper and a lower flange linked by a beam web and having a plurality of vertical beam web stiffeners positioned along the beam at intervals, with a runway rail positioned on top of the runway beam. The method includes the step of providing a measurement unit configured to remain stationary during measurement of two rails which collectively form a runway, wherein the measurement unit includes a 3-D laser scanner on a support base. The method further includes the steps of acquiring a point cloud of a segment of the crane runway beam; converting the point cloud into a triangulated irregular network (TIN) surface; converting the TIN surface into a raster image; detecting edges of the beam web surface segments, wherein each beam web surface segment is delineated by upper and lower runway beam flanges in the vertical dimension and by runway beam stiffeners in the horizontal dimension; identifying runway beam joints; determining an average value of points between two adjacent runway beam joints; determining an average value of points for each beam web surface segment; determining an average value of points between two adjacent runway beam joints; measuring the distance from each web surface segment to a crane bay centerline at the bottom, middle, and top locations along the runway beam; and determining the deviation between: the distance from the crane bay centerline and the average value of points between two adjacent runway beam joints, and the distance from the crane bay centerline and each beam web surface segment at the top, bottom, and middle locations, wherein when the deviation exceeds a pre-determined threshold the runway beams are not aligned, and wherein when the deviation is at or below the pre-determined threshold the runway beams are aligned.

The present disclosure further provides a non-contact method for measuring 3-D alignment of an overhead crane runway rail. The method includes the step of providing a measurement unit configured to remain stationary during measurement of two rails which collectively form a runway, wherein the measurement unit includes a 3-D laser scanner on a support base. The method further includes the steps of acquiring a point cloud of a segment of the crane runway rail; converting the point cloud into a voxel data structure; obtaining a cross section of the crane runway rail; obtaining a cross section of a reference rail from a reference rail voxel data structure; performing a fast-Fourier transform (FFT) image matching between the voxel data structure and the reference rail voxel data structure; and determining the deviation between the cross section of the crane runway rail and the reference rail cross section, wherein when the deviation exceeds a pre-determined threshold the runway rails are not aligned, and wherein when the deviation is at or below the pre-determined threshold the runway rails are aligned.

It is to be understood that both the foregoing general description and the following detailed description are exemplary, but are not restrictive, of the disclosure.

BRIEF DESCRIPTION OF THE DRAWING

The disclosure is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures:

FIG. 3A illustrates an exemplary Triangulated Irregular Network (TIN) surface;

FIG. 3B illustrates a raster grid image produced by conversion of the exemplary TIN surface shown in FIG. 3A;

FIG. 4A is an image showing the different components of a runway beam;

FIG. 4B is a binary image showing the stiffeners and areas (called panels) between adjacent stiffeners on the web of a runway beam;

FIG. 8A is a representative example of the cross-section of the runway rail in voxel format;

FIG. 8B illustrates the FFT image matching results highlighting the best match between the data of FIG. 8A and the standard rail cross-section;

FIG. 8C illustrates the FFT results highlighting the best match and with a rectangular box placed over the best location to identify two important rail locations (the lower right corner of the box identifies the rail web and the upper right corner of the box identifies the rail head);

DETAILED DESCRIPTION OF THE DISCLOSURE

The described rail survey system can be used to survey an overhead crane rail for straightness, span, and elevation. Further, the survey information collected can be used to determine whether an overhead crane is skewed at any measurement point.

Figure 2A:
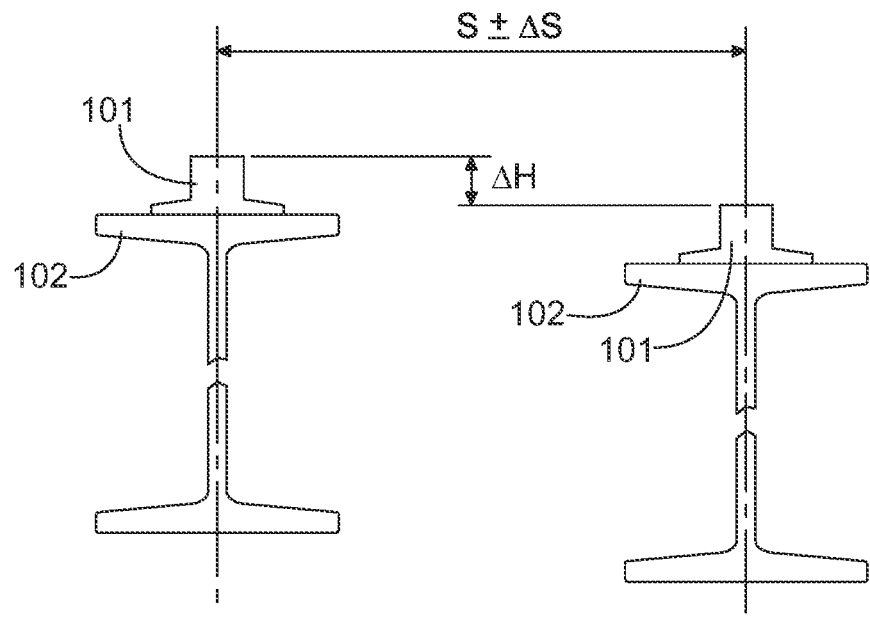
FIG. 2A is a cross-sectional schematic view of a crane runway rail, in position on a runway beam, highlighting the parameters that are measured during an overhead alignment survey.

Referring now to the drawing, in which like reference numbers refer to like elements throughout the various figures that comprise the drawing, FIG. 2A is a cross-sectional schematic view of a crane runway rail 101, in position on a runway beam 102, highlighting the parameters that are measured during an overhead crane rail alignment survey. The parameter ΔS represents the deviation from the rail span S, which is the horizontal distance between adjacent runway rails 101. The standard permissible ΔS for rail spans of 15 meters or below is 3 mm, and for wider rail spans 0.25 mm is added for every meter above 15 meters. Therefore, the ΔS for a 20-meter span is calculated as 3+(5×0.25)=4.25 mm up to a maximum of 15 mm.

The parameter ΔH represents the deviation in height between adjacent runway rails 101, or the vertical alignment deviation between the runway rails 101, which is also reflective of the vertical alignment deviation between the runway beams 102. The standard permissible ΔH is a maximum of 10 mm.

Figure 2B:
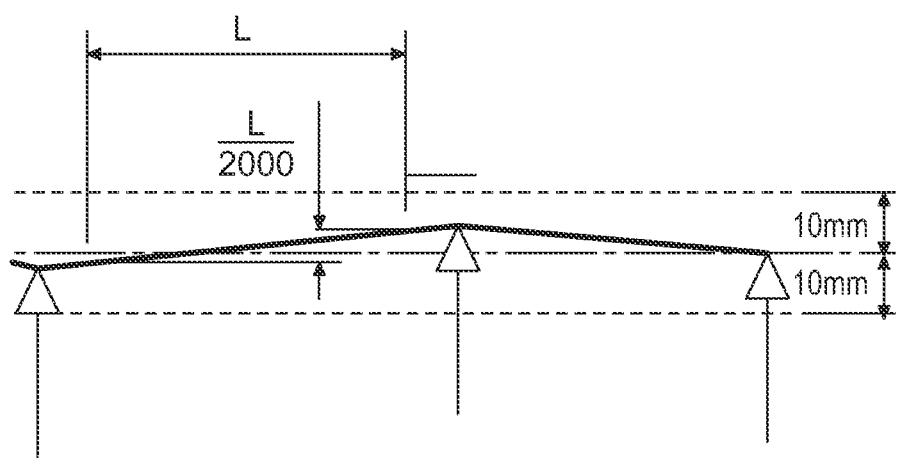
FIG. 2B is a top schematic view of the permissible deviation in track straightness of the crane runway rail, in position on the runway beam, in the horizontal and vertical planes.

FIG. 2B is a top schematic view of the permissible deviation in track straightness of the crane runway rail 101, in position on the runway beam 102, in the horizontal and vertical planes. The local vertical or horizontal deviation at any point of the track should not be greater than L/2000, measured over a length L of not less than 2 meters on a line parallel to the theoretical datum as shown (right). For any track segment having a length L above 2 meters, the deviation should not exceed 10 mm.

Figure 1A:
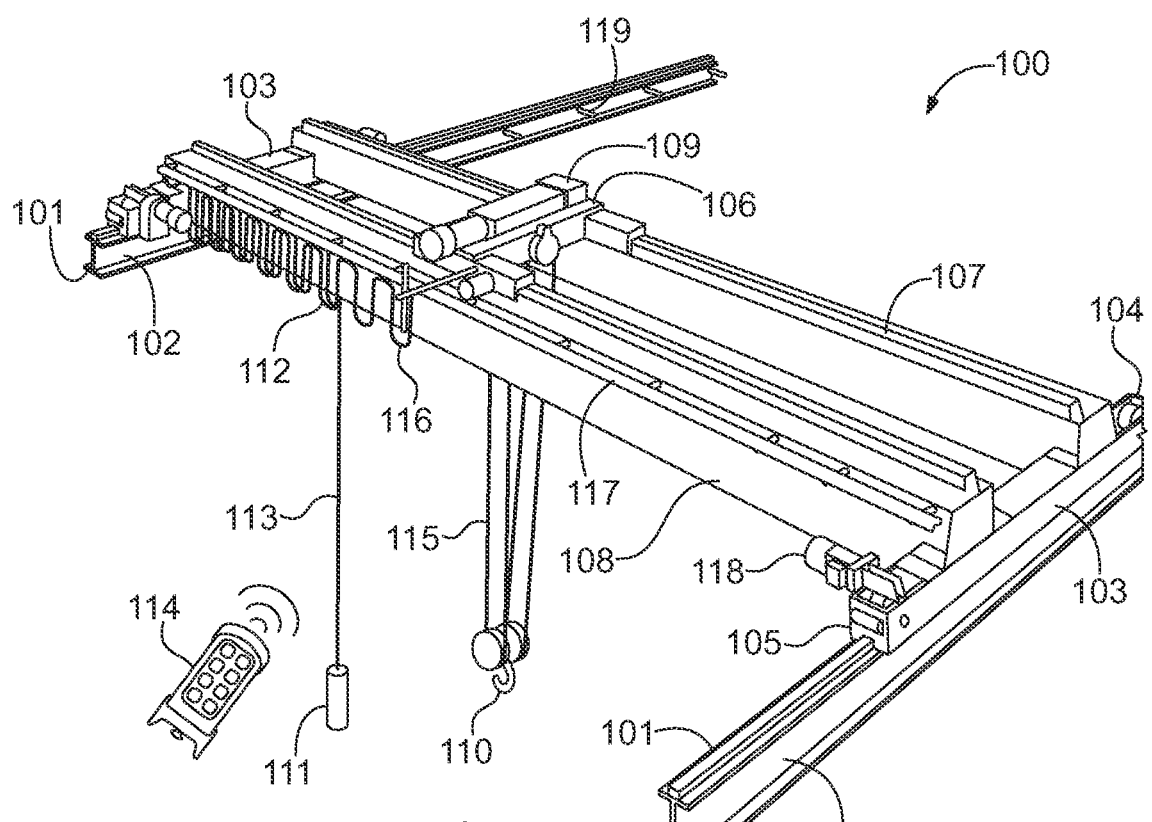
FIG. 1A is a schematic perspective view of an exemplary overhead crane with which exemplary embodiments of the described rail survey system can be used.
Figure 1B:
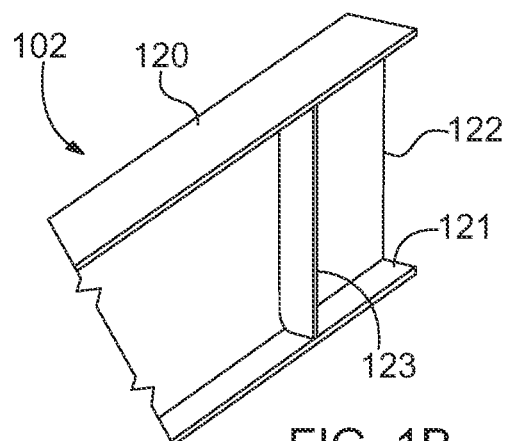
FIG. 1B is a schematic perspective view of an exemplary overhead crane runway beam.

The embodiments of the disclosed system use a well-known 3D laser scanning technology to collect data on spatial position of the parts of the overhead crane as shown in FIG. 1A, specifically, the runway beam 102 and the runway rail 101. The system comprises a measurement unit including a 3D laser scanning device mounted on a support base. Multiple 3D laser scanning devices suitable for use as a component of the inventive system are commercially available and include, without limitation, Z+F IMAGER® 5016, 3D Laser Scanner, FARO FOCUS, and Leica Scan-Station P40/P30. In some embodiments, the system is configured to collect the data from the ground and is positioned in the crane bay, optimally on the centerline of the crane bay. In some embodiments, the ground-positioned system comprises a support base optimized for stationary ground placement, for example a tripod. In some embodiments, the ground-positioned system is configured to be movable and comprises a movable platform, for example a wheeled carriage or a tripod and dolly platform. In some embodiments, the movable platform is powered. In some embodiments, the movable platform is remotely controlled.

In some embodiments, the measuring unit of the system further comprises a stabilization element configured to physically level the 3D scanner and to minimize the effects of vibration. Multiple automatic leveling and stabilization elements are known in the art and are described, for example, in U.S. Pat. Nos. 3,123,330; 5,963,749; 5,419,521; 8,938,160; 9,534,730; and 10,315,781. As used in this document, the term "level" refers to a vertical (perpendicular) positioning of the 3D laser scanner relative to the plane of reference, e.g., the horizontal plane.

In some embodiments, the measurement unit of the system further comprises one or more internal sensors configured to collect the data that can be used to correct for deviations of the measuring unit from the optimal spatial positioning (for example, deviations to vertical positioning relative to the horizontal plane). Such sensors are well known in the art and include, without limitation, acceleration sensors, motion sensors, and tilt sensors, such as dual axis compensators.

In some embodiments, the system is configured to collect the data from the crane and is positioned, for example, on the crane bridge girder (designated 108 in FIG. 1A) or an end carriage (designated 103 in FIG. 1A). In some embodiments, the system is positioned on one of the runway beams (designated 102 in FIG. 1A). In some embodiments, the system comprises an attachment such as a clamp for mounting the support base to the crane bridge girder 108, the runway beam 102, or the end carriage 103.

In some embodiments, the measurement unit further comprises an interface which transmits the data collected by the 3D laser scanner and internal sensors. In some embodiments, the interface comprises at least one output unit for outputting data from the internal processes of the measurement unit. In some embodiments, the output unit comprises a port for machine readable media. If a line interface is applied, the interface unit typically comprises plug-in units acting as a gateway for information delivered to its external connection points. If a radio interface is applied, the interface unit typically comprises a radio transceiver unit, which includes a transmitter and a receiver, and is also electrically connected to a computing unit. Depending on the application, the interface unit may also support more than one type of interface. In some embodiments, the interface is a Network/Wide Area Network/Internet Network that supports data communication and data transfers between the measuring unit and the computing unit.

In some embodiments, the measuring unit provides raw measurement data, such as a point cloud obtained from the 3D laser scanner. In some embodiments, the measuring unit is configured to pre-process the values into coordinate values of a defined type and/or complement the values with defined metadata.

The data collected by the measuring unit of the system is analyzed by a computing unit comprising a receiver that receives the 3D laser scanner data transmitted by the interface, a data storage unit, and a processor configured to compute one or more of crane rail 3D alignment, crane runway beam 3D alignment, crane runway beam flange camber, crane runway beam web warp and lean, hot rail 3D alignment, crane column 3D position and lean, crane column beam seats, and direct span measurement. In some embodiments, the measuring unit and the computing unit form a single integral assembly. (By "integral" is meant a single piece or a single unitary part that is complete by itself without additional pieces, i.e., the part is of one monolithic piece formed as a unit with another part.) In some embodiments, the computing unit is separate from the measurement unit. In some embodiments, the computing unit is positioned remotely from the measuring unit. In some embodiments, the computing unit is configured to process the data received from the measuring unit in real time. In some embodiments, the computing unit is configured to store the data received from the measuring unit in the data storage unit for later processing. In some embodiments, the storage unit of the computing unit stores one or more series of computing instructions related to use and analysis of the rail survey data collected. Several types of data storage units are suitable for use in the context of the system, such as a hard-drive or firmware storage.

In some embodiments, the processor of the computing unit includes internal components that allow the processor to communicate with the above-described hardware components to send and receive data and instructions. In some embodiments, suitable processors include a variety of various processors such as dual microprocessors and other multi-processor architectures. In some embodiments, the processor is configured to store a series of computing instructions related to use and analysis of the rail survey data collected. In some embodiments, the processor is configured to access and retrieve a series of computing instructions related to use and analysis of the rail survey data collected from the storage unit. In some embodiments, the processor is further configured to execute a series of computing instructions related to use and analysis of the rail survey data collected. In this manner, upon receiving instructions to perform a rail survey analysis in support of the above-described approach, the processor can apply a series of computational transformations to the data received from the measuring unit via the interface and compute any of the parameters listed above.

A 3D scanner can acquire millions of points at high precision. In the disclosed system, multiple scans are acquired of the entire runway beam with enough overlap, resulting in a dense point cloud which covers the runway beams 102 and runway rails 101. The point cloud is then referenced to an arbitrary right-handed reference frame located at the center of the bay such that the X-axis is oriented parallel to the runway beam direction and the Z-axis points upward parallel to the plumb direction.

The point cloud of the runway beam 102 is converted by the system to a triangulated irregular network (TIN) surface. As shown in FIG. 3A, which illustrates a TIN surface 130 produced by conversion of a point cloud of the runway beam 102, the TIN surface 130 is created by connecting the point dataset. The TIN surface 130 creates a continuous surface over areas of low point density. The system then converts the TIN surface 130 to a raster grid image 132 by interpolating values at regular intervals from the TIN surface 130. FIG. 3B illustrates the raster grid image 132 produced by conversion of the TIN surface 130.

FIG. 4A is an image showing the different components of the runway beam 102. Specifically illustrated are a runway beam joint 134 and a plurality of stiffeners 123. The image shows the 3D point cloud of the runway beam 102 converted to a raster form.

The system then performs an edge detection analysis on the image shown in FIG. 4A, which results in the image shown in FIG. 4B. FIG. 4B is a binary image showing the stiffeners 123 and the areas (called panels) 136 between adjacent stiffeners 123 on the web 122 of the runway beam 102. The image shows regular regions of each panel 136. The "+" sign on the image of FIG. 4B shows the location 138 where the column supports the joint 134 between two runway beams 102.

The runway beam joint 134 is where two runway beams 102 are connected. Columns support the runway beams 102 at the joints 134. The joint 134 has a particular pattern and shape which can be seen in the images of FIGS. 4A and 4B. The joint locations are identified semi-automatically by selecting the first two joints 134 manually. Then the system identifies subsequent joints 134 using two criteria: (1) the pattern and shape of a joint; and (2) the manually identified distance between the first two columns. A manual check (and correction, if required) is performed to ensure proper joint identification.

The system processes the points within the extent of each panel 136 to locate the web 122. The system filters the points in this area with reference to the average surface value. Any outliers greater than 90th percentile variation from the mean are removed, resulting in a plane surface. The system then adopts two coloring approaches.

Figure 5A:
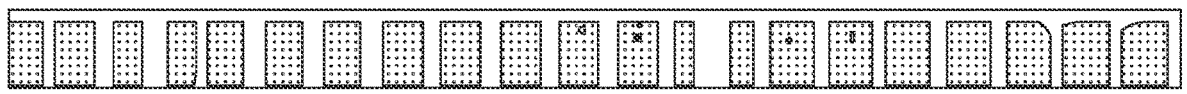
FIG. 5A is a map of the deformations of the web in the panels between adjacent stiffeners with reference to the average value of points between two adjacent stiffeners (each panel is referenced to the average panel's distance to the crane bay centerline)

The first coloring approach maps deformations of the web 122 between two stiffeners 123 (i.e., at the panels 136) with reference to the average value of points between the two stiffeners 123. FIG. 5A illustrates this map. Each panel 136 is referenced to the average panel's distance to the crane bay centerline. FIG. 5A shows the web 122 using a color ramp from blue=−1 inch (−2.5 cm), to green=0, to red=+1 inch (+2.5 cm) deformation. These deformations are from the average point value between two stiffeners 123.

Figure 5B:
FIG. 5B is a map of the deformations of the web in the panels between adjacent stiffeners with reference to the average value of points between two adjacent runway beam joints at which columns support the runway beam (each panel is referenced to the average runway beam's distance to the crane bay centerline, and plus signs demark one section of the runway beam)

The second coloring approach shows the deformation of the web 122 with reference to the average of points between two adjacent runway beam joints 134. FIG. 5B is a map of the deformations of the web 122 in the panels 136 between adjacent stiffeners 123 with reference to the average value of points between two adjacent runway beam joints 134 at which columns support the runway beams 102 (each panel 136 is referenced to the average runway beam's distance to the crane bay centerline, and plus signs demark one section of the runway beam 102). Like FIG. 5A, FIG. 5B shows the web 122 using a color ramp from blue=−1 inch (−2.5 cm), to green=0, to red=+1 inch (+2.5 cm) deformation.

Figure 5C:
FIG. 5C shows the three profiles (bottom, middle, and top locations) along which the distances between the web and the crane bay centerline are measured.

FIG. 5C shows the three profiles (bottom, middle, and top locations) along which the distances between the web 122 and the crane bay centerline are measured. Specifically, the profiles include a bottom profile 140*a* taken along the bottom of the image, a middle profile 140*b* taken along the middle of the image, and a top profile 140*c* taken along the top of the image.

Figure 5D:
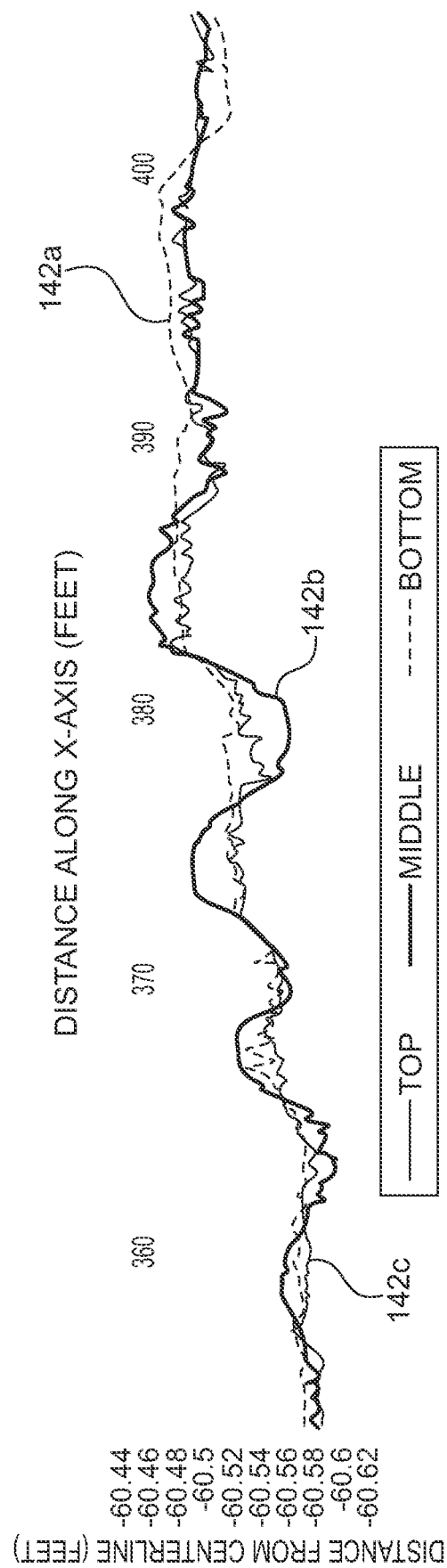
FIG. 5D is a graph of the distances from the runway beam web to the crane bay centerline measured at the bottom, middle, and top locations as shown in FIG. 5C.

FIG. 5D is a graph of the distances (on the ordinate in feet) from the runway beam web 122 to the crane bay centerline measured at the bottom profile 140*a*, at the middle profile 140*b*, and at the top profile 140*c*, as shown in FIG. 5C, versus the distance along the X-axis (on the abscissa also in feet). (The abscissa and the ordinate are the horizontal and vertical axes, respectively, typically the x-axis and y-axis of a two-dimensional graph.) These distances when plotted show the alignment of the web 122 in the X and Z directions (parallel to the bay centerline and in the plumb direction). The curve 142*a* corresponds to the bottom profile 140*a*, the curve 142*b* corresponds to at the middle profile 140*b*, and the curve 142*c* corresponds to the top profile 140*c*.

Figure 6A:
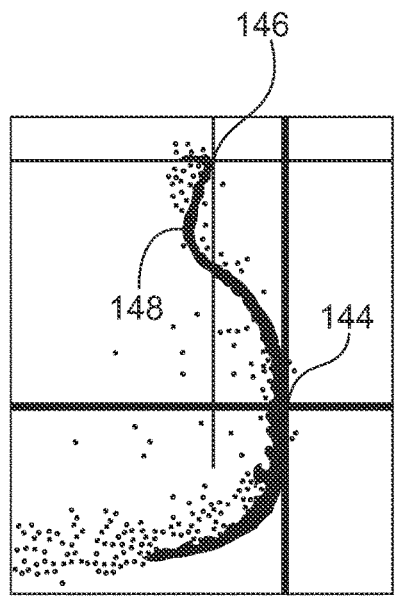
FIG. 6A illustrates an example of an actual point cloud of a runway rail.
Figure 6B:
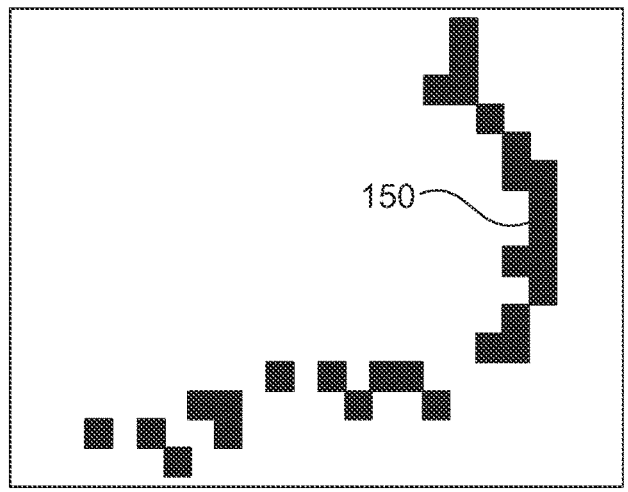
FIG. 6B illustrates a voxel data structure representation of the point cloud shown in FIG. 6A.

The system also performs mapping of the runway rail 101. The goal of rail mapping is to map two important locations: the rail web 126 and the rail head 124 (see FIG. 7A). FIG. 6A illustrates an example of an actual point cloud 148 of a runway rail 101, with the rail web 126 shown as a red "+" or plus sign 144 and the rail head 124 shown as a yellow "+" or plus sign 146, respectively. The system achieves the task of rail mapping by matching a standard section of rail point data and a template of a standard rail section. FIG. 6B illustrates a voxel data representation 150 of the actual point cloud 148 shown in FIG. 6A.

Figure 6C:
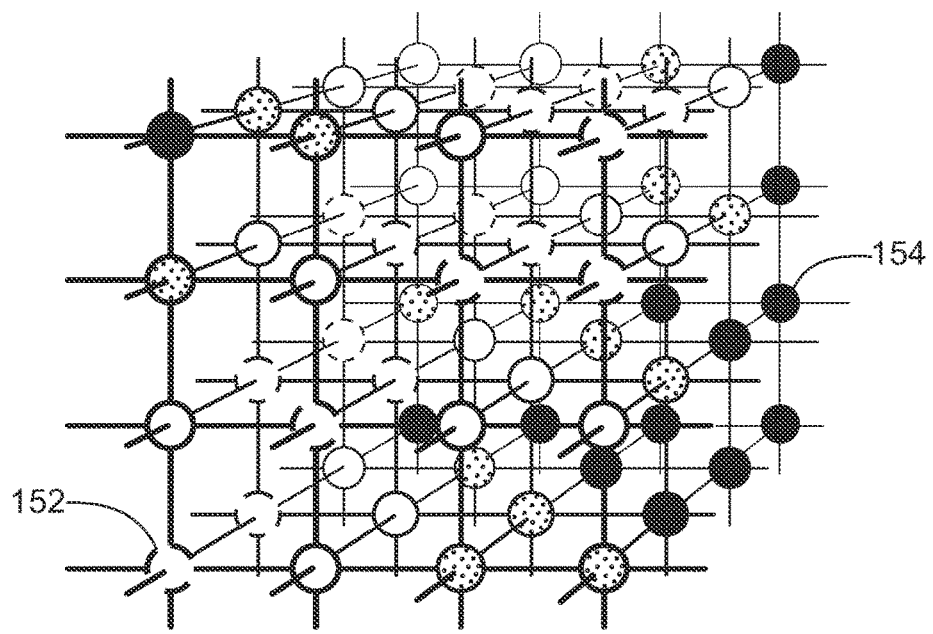
FIG. 6C is a representative illustration of a voxel grid, with each voxel marked as a white or black ball.

The voxel data representation 150 comprises 3D cubes of 0.5 inches (1.25 cm) in dimension (an exemplary representation of unrelated voxel data is shown in FIG. 6C). A modified rectangular voxel can be created, however, such that the Y- and Z-dimensions are 0.4 inches (1 cm) and the X-dimension is 10 inches (25.4 cm). A voxel is like a pixel, which represent a value on a regular grid in three-dimensional space. A Cartesian coordinate system (X, Y, Z) is a coordinate system that specifies each point uniquely in three-dimensional space by three Cartesian numerical coordinates, which are the signed distances to the point from three, fixed, mutually perpendicular directed lines, measured in the same unit of length. Each reference line is called a coordinate axis or just an axis of the system, and the point where they meet is its origin, usually at ordered triplet (0, 0, 0). The coordinates can also be defined as the positions of the perpendicular projections of the point onto the three axes, expressed as signed distances from the origin.

FIG. 6C is a representative illustration of a voxel grid, with each voxel marked as a light ball 152 or a dark ball 154. Every small 3D voxel cube stores the number of points within its extents. In FIG. 6C, every such cube is marked as a white ball 152 whereas the rest are black balls 154.

Figure 7A:
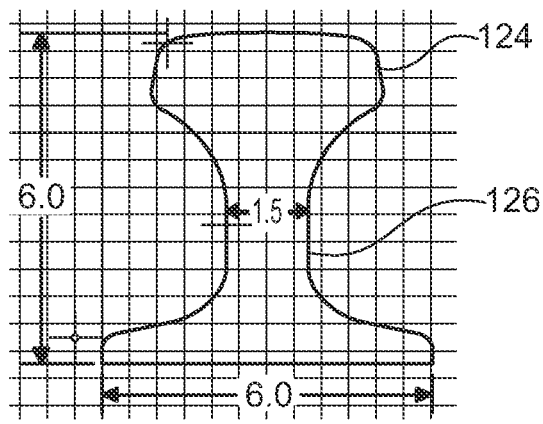
FIG. 7A illustrates standard dimensions of an example template of a complete rail section.
Figure 7B:
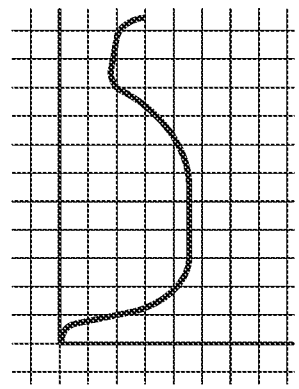
FIG. 7B illustrates a half face of the rail section shown in FIG. 7A.
Figure 7C:
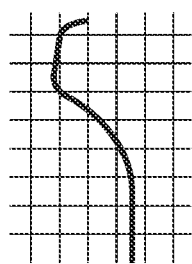
FIG. 7C illustrates the half face of the rail section shown in FIG. 7B without the bottom 2 inches (5 cm)
Figure 7D:
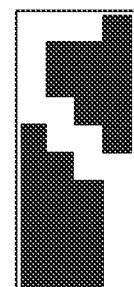
FIG. 7D illustrates the voxel cross section of the rail voxel data structure for the top 4 inches (10 cm) of the half face of the rail section shown in FIG. 7C.

Similarly, the system also converts the standard rail template to a voxel data structure. FIG. 7A illustrates the standard dimensions of an example template of a complete rail section: the rail section has a total height of 6 inches (15.25 cm), a web thickness of 1.5 inches (3.8 cm), and a maximum width defining its footprint of 6 inches (15.25 cm). Only one face of the template is used for matching purposes because 3D point data are available only from one side of the rail as shown in FIG. 7B. FIG. 7B illustrates a half face of the rail section shown in FIG. 7A. Further, only the top 4 inches (10 cm) of the rail data are converted to voxel because the lower portion is covered by clips at regular intervals to hold the rail in place. FIG. 7C illustrates the half face of the rail section shown in FIG. 7B without the bottom 2 inches (5 cm). The resulting voxel cross-section is shown in FIG. 7D. Thus, FIG. 7D illustrates the voxel cross section of the rail voxel data structure for the top 4 inches (10 cm) of the half face of the rail section shown in FIG. 7C.

At this point, both the rail point cloud and the template are in voxel format. At every voxel increment along the length of the rail, the system obtains the cross section as shown in FIG. 8A (which is a representative example of the cross-section of the runway rail in voxel format). The system then uses the cross section to perform a fast-Fourier transform (FFT) image matching. FIG. 8B illustrates the FFT image matching results highlighting the best match between the data of FIG. 8A and the standard rail cross-section. The best match is highlighted in the light color. FIG. 8C illustrates the FFT results highlighting the best match and with a rectangular box placed over the best location to identify the two important rail locations (the lower right corner of the box identifies the rail web 126 and the upper right corner of the box identifies the rail head 124).

Figures 9A, 9B:
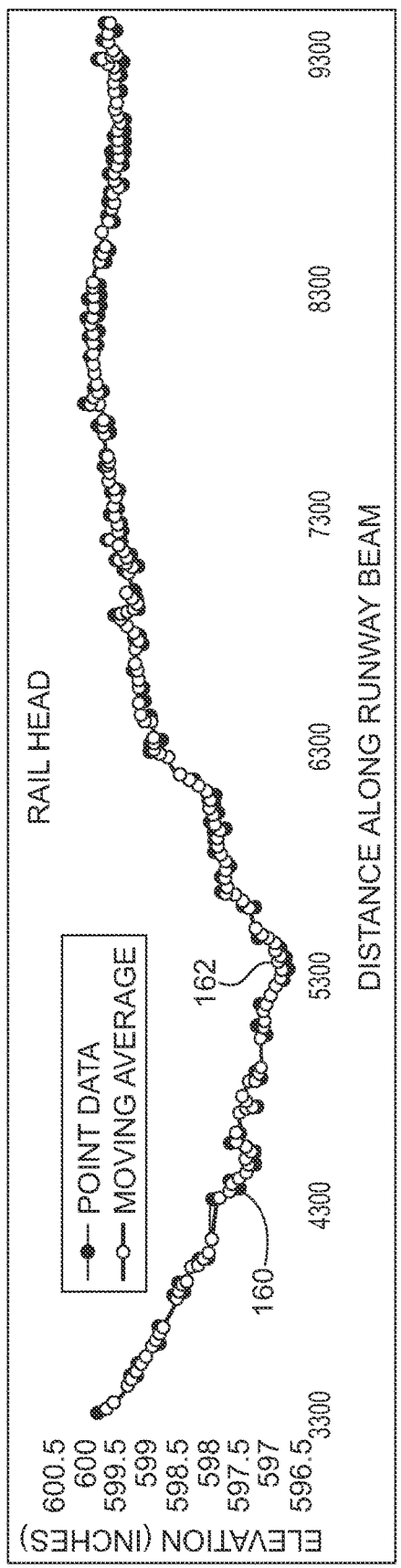
FIG. 9A is a graph of the elevation of the rail head against the distance along the runway beam.
FIG. 9B is a graph of the horizontal distance from the centerline of the web center against the distance along the runway beam.

The system implements the process identified above for the entire length of the runway beam 102 to obtain the locations of the rail web 126 and the rail head 124. The elevations at these locations are plotted in FIGS. 9A and 9B. FIG. 9A is a graph of the elevation of the rail head 124 (on the ordinate in inches) against the distance along the runway beam (on the abscissa). Illustrated are both the point data 160 and the moving average 162. FIG. 9B is a graph of the horizontal distance from the centerline of the web center (on the ordinate in inches) against the distance along the runway beam (on the abscissa). Illustrated are both the point data 164 and the moving average 166.

Figure 10:
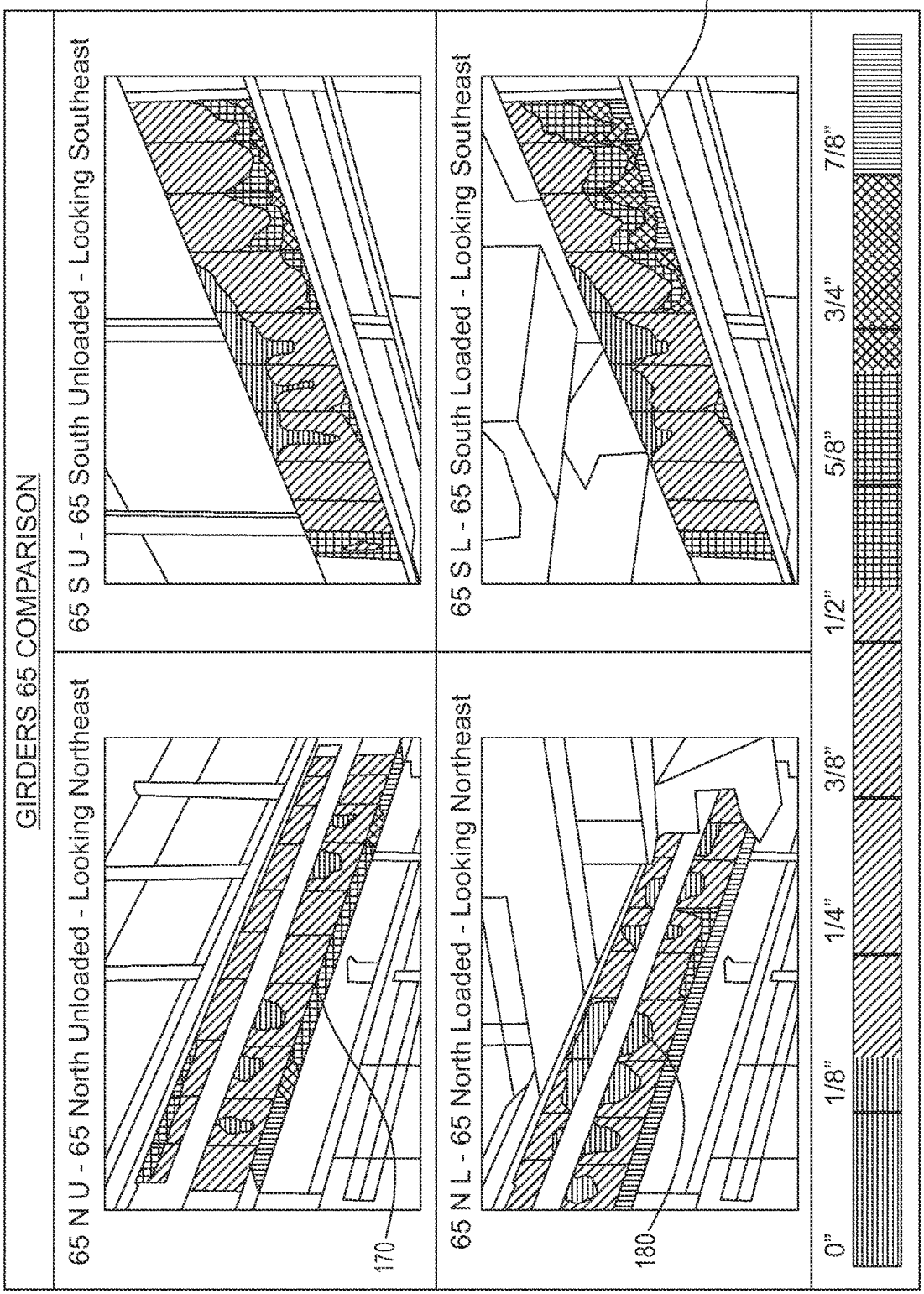
FIG. 10 is a representative map illustrating runway beams with and without load superimposed on a photographic image of an overhead crane.

FIG. 10 is a representative map illustrating runway beams with and without load superimposed on a photographic image of an overhead crane. By applying a color scheme to the shape of the beam, the direction and amount of deflection, roll, camber, or bulging that occurs in the beam can be shown. In the color scheme, red represents an area that deviates 1 inch (2.5 cm) from the minimum deflection value. The top images show the same beam span in a runway, except one is on the north side of the bay and the other is the south side of the bay. The lower images show the same beams, now with a crane and load parked on top of the beam. In the loaded images (bottom images), the user can easily interpret the amount of deflection, roll, camber, or bulging that occurs once a loaded crane is in that area. The top left image illustrates camber 170; the bottom left image illustrates bulging 180; and the bottom right image illustrates roll 190.

Figure 11:
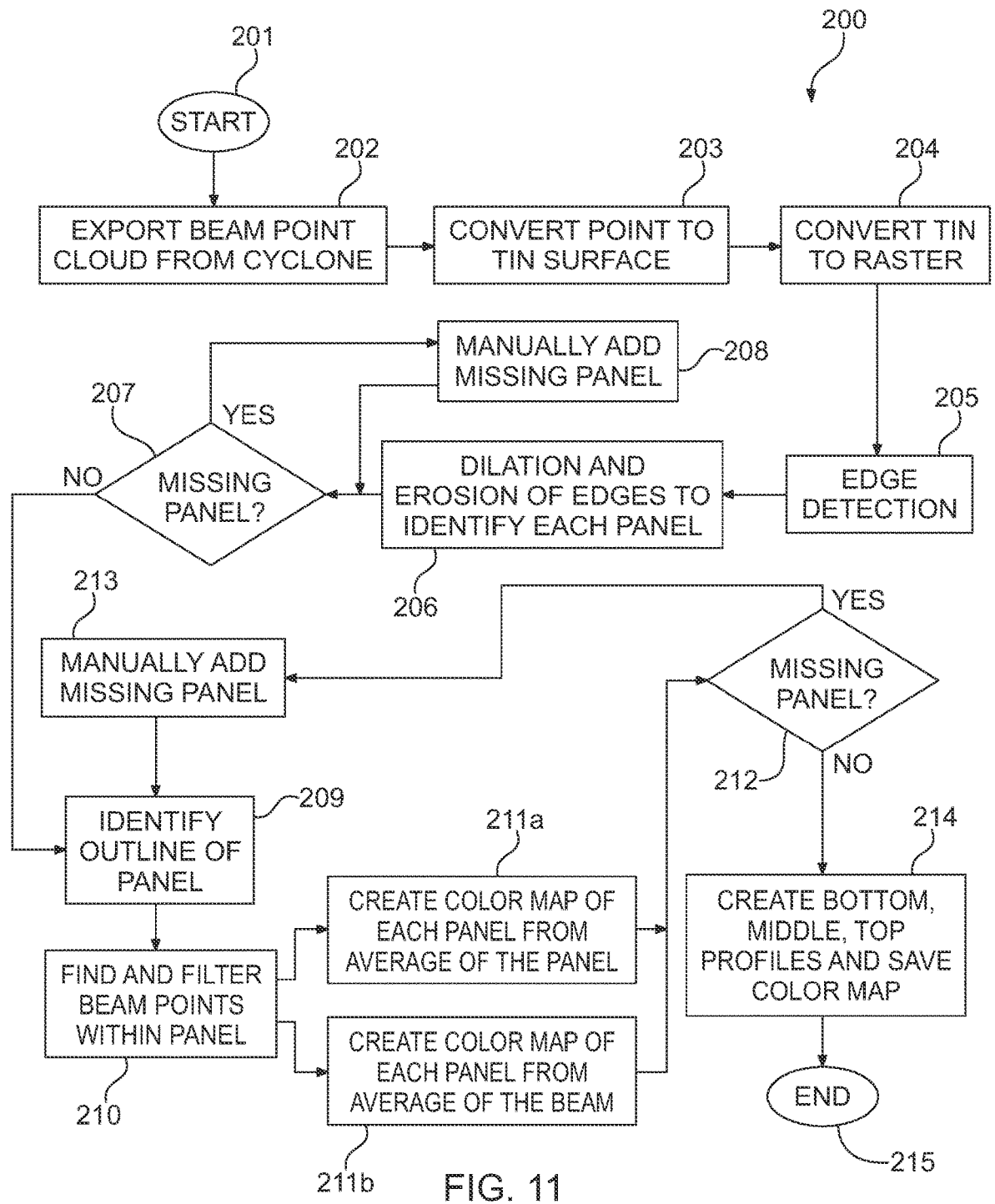
FIG. 11 is flow diagram illustrating an exemplary method of performing a rail survey using information collected from a 3D scanner in the described rail survey system.

FIG. 11 is a flow diagram illustrating an exemplary method 200 of performing a rail survey using information collected using exemplary embodiments of the rail survey system described above. In the method, it is assumed that a measuring unit has been positioned on the ground at the centerline of the overhead crane bay. The method starts at Step 201. As shown in FIG. 11, at Step 202 data are obtained from the 3D laser scanner of the measuring unit and the point cloud of the runway beam 202 is exported from point cloud processing software. Leica Geosystems Holdings AG of Switzerland sells, under the trademark "Cyclone," the market-leading point cloud processing software. The Cyclone product is a family of software modules that provides a wide set of work process options for 3D laser scanning projects in engineering, surveying, construction, and related applications.

In Step 203, the point cloud of the runway beam 202 is converted to a triangulated irregular network (TIN) surface 130 as shown in FIG. 3A. Several methods of generating a TIN surface are known in the art and described, for example, in the U.S. Pat. Nos. 7,774,381; 7,561,990; and 7,804,498. The TIN surface 130 is subsequently converted, in Step 204, into a raster grid surface 132 (as shown in FIG. 3B) by interpolating values at regular intervals from the TIN surface 130, resulting in an image of the runway beam surface as shown in FIG. 4A.

In Step 205, the image of FIG. 4A is further processed to identify the points corresponding to the runway beam web 122. This is accomplished by detecting the edges of each runway beam panel 136, wherein the upper and lower edges correspond to the upper flange 120 and the lower flange 121 of the runway beam 102 and the lateral edges correspond to the beam stiffeners 123. The points corresponding to the flanges 120 and 121 and the stiffeners 123 are elevated with respect to the web surface. In addition, the beam joints 134 are identified. The edge detection analysis performed in Step 205 on the image shown in FIG. 4A results in the image shown in FIG. 4B.

In Step 206, as shown in FIG. 11, each panel 136 is identified by dilation and erosion of edges. This step removes the outlier points that do not fall on the panel 136, i.e., the step performs a clean-up operation. The data are then visually examined for missing panels 136 at Step 207. Missing panels, if any, are manually added at Step 208 and the method cycles through Steps 207 and 208 until there are no missing panels.

Subsequently, at Step 209, an outline of the panel 136 is identified. The points within each panel 136 are found and filtered, in Step 210, to remove outliers that elevated above or below the surface of runway beam web 122. At the next steps, two types of color maps are created. In Step 211*a*, a color map is created of each panel 136 from the average of the panels. In Step 211*b*, a color map is created of each panel 136 from the average runway beam's distance to the crane bay centerline. Examples of the resulting color maps are shown in FIG. 5A and FIG. 5B. In Step 212, the data are visually examined for missing panels 136. Missing panels, if any, are manually identified and added at Step 213 and the method cycles through Steps 209, 210, 211*a* and 211*b*, and 212 until there are no missing panels.

In some embodiments, the deviations from the centerline are measured along a longitudinal line spanning the length of the runway beam 102. In some embodiments, the deviation is measured along two longitudinal lines. In some embodiments, the deviation is measured along three longitudinal lines. In some embodiments, the deviation is measured along more than three longitudinal lines. An exemplary arrangement of three measuring lines or profiles 140*a*, 140*b*, and 140*c* is illustrated in FIG. 5C. In Step 214, as shown in FIG. 11, the profiles 140*a*, 140*b*, and 140*c* are created and the colormaps are saved. The method 200 then ends at Step 215. In some embodiments, the deviation data obtained along each line or profile can be presented in a graph form (see FIG. 5D). In some embodiments, the color maps can be superimposed on a photographic image as shown in FIG. 11.

In some embodiments, the data and the processing method 200 described above can also be used to survey alignment of a crane hot rail and of the position and lean of runway beam support columns. In some embodiments, the data can be used to identify deformations in the crane runway beam, crane hot rail, or crane support columns. The discoverable deformations include, but are not limited to, bending, buckling, warping, and twisting. In some embodiments, these data can be also used to identify the possible presence of cracking in runway beams, hot rails, or support columns and in evaluating the reparability of deformed sections.

In some embodiments, the survey system is configured to measure the 3D alignment of the runway rails 101. In the method described below, it is assumed that a measuring unit has been positioned on the bridge girder 108 (see FIG. 1A), an end carriage 103, or on one of the runway beams 102 and acquires a point cloud of the crane runway rail 101. FIG. 6A illustrates an example of an actual point cloud 148 of a runway rail 101. In some embodiments, for analysis of runway rail 3D alignment, the processor is configured to convert the runway rail point cloud transmitted from the measuring unit into a voxel data representation 150 as shown in FIG. 6B. In some embodiments, the voxel data are used to construct a voxel grid as shown in FIG. 6C. In some embodiments, the voxel data are used for volume rendering. In some embodiments, the voxel data are used to extract an isosurface using a matching cubes algorithm.

In some embodiments, the processor is further configured to compare the voxel dataset obtained from a 3D runway rail survey to a reference voxel dataset obtained from a reference rail (FIG. 7A) that has been pre-loaded into the data storage unit of the computing unit. In some embodiments, the reference dataset is obtained by scanning the entire face of a reference rail (FIG. 7B). In some embodiments, the reference dataset is obtained from a segment of a face of the reference rail. In some embodiments, the scanned segment of the reference rail encompasses the rail head 124 and rail web 126 (FIG. 7C). A representative voxel data set obtained from a reference rail is shown in FIG. 7D.

In some embodiments, the processor is configured to compare voxel datasets using computational image matching. Multiple methods of computational image matching that are suitable for the present analysis are known in the art, including but not limited to scale invariant feature transform (SIFT), speed up robust feature (SURF), robust independent elementary features (BRIEF), oriented FAST, rotated BRIEF (ORB), discrete Fourier transform (DFT), discrete cosine transform (DCT), fast Fourier transform (FFT), inverse fast Fourier transform (I-FFT), and random sample consensus (RANSAC). In a preferred embodiment, an FFT image matching approach is used (see FIGS. 8A-C).

In some embodiments, the deviation between a reference dataset and a survey dataset can be presented in a graph form (see FIGS. 9A and 9B). In some embodiments, the color maps can be superimposed on a photographic image. In some embodiments, the data and the processing method described above can be used to identify deformations in the crane runway rail 101. The discoverable deformations include, but are not limited to, bending, buckling, warping, and twisting. In some embodiments, these data can also be used to identify the presence of cracking in the runway rail 101, hot rail, or support columns and in evaluating the feasibility of repairing the deformed section.

In some embodiments, the processor is further configured to receive the spatial positioning data from the measuring unit (e.g., tilt angle) and, if the position of the measuring unit is not optimal (e.g., vertical), to use these data to correct the 3D laser scanner measurements for deviations. In some embodiments, tilt of the measuring unit is corrected by measuring a tilt angle between the reference plane of the support base and the plane perpendicular to the ambient gravitational force.

In some embodiments, the crane-mounted measuring system further comprises a motion sensor and is configured to sense the movement of the bridge rail 107 and to automatically activate and collect the data every time the bridge rail 107 is stationary. Motion sensors suitable for use with the disclosed system are known in the art and are described, for example, in U.S. Pat. Nos. 10,257,499; 10,157,535; 9,983,025; 9,900,669; 9,863,767; 9,789,393; 9,726,516; 8,854,544; 8,631,701; 8,416,094; 8,410,774; 8,393,214; 8,354,643; and 8,314,390.

In some embodiments, the system is further configured to generate reports and/or alarms for crane operating and monitoring personnel via, for example, one or more network-connected crane operator workstations or consoles, as a result of determining that applicable crane specification requirements have been exceeded.

Also disclosed in this document are methods of non-contact measuring of 3-D alignment of an overhead crane runway beam 102 having an upper flange 120 and a lower flange 121 linked by a beam web 122 and having a plurality of vertical beam web stiffeners 123 positioned along the beam 102 at intervals. A runway rail 101 is positioned on top of the runway beam 102. The method comprises: providing a measurement unit configured to remain stationary during measurement of two runway rails 101 which collectively form a runway, wherein the measurement unit includes a 3-D laser scanner on a support base; acquiring a point cloud 148 of a segment of the crane runway beam 102; converting the point cloud 148 into a triangulated irregular network (TIN) surface 130; converting the TIN surface 130 into a raster image; detecting edges of beam web surface segments, wherein each beam web surface segment is delineated by upper and lower runway beam flanges in the vertical dimension and by runway beam stiffeners in the horizontal dimension; identifying runway beam joints 134; determining an average value of points between two adjacent runway beam joints 134; determining an average value of points for each beam web surface segment; measuring the distance from each web surface segment to a crane bay centerline at the bottom, middle, and top locations along the runway beam 102; and determining the deviation between either the distance from the crane bay centerline and the average value of points between two adjacent runway beam joints 134 or the distance from the crane bay centerline and each beam web surface segment at the top, bottom, and middle locations, wherein when the deviation exceeds a pre-determined threshold the runway beams 102 are not aligned, and wherein when the deviation is at or below the pre-determined threshold the runway beams 102 are aligned. By "pre-determined" is meant determined beforehand, so that the predetermined characteristic (e.g., the threshold) must be determined, i.e., chosen or at least known, in advance of some event (e.g., the start of the method).

The present invention further provides methods of non-contact measuring of 3-D alignment of an overhead crane runway rail 101. An example method comprises: providing a measurement unit configured to remain stationary during measurement of two runway rails 101 which collectively form a runway, wherein the measurement unit includes a 3-D laser scanner on a support base; acquiring a point cloud of a segment of the crane runway rail; converting the point cloud into a voxel data structure; obtaining a cross section of the crane runway rail; obtaining a cross section of a reference rail from a reference rail voxel data structure; performing a fast-Fourier transform (FFT) image matching between the voxel data structure and the reference rail voxel data structure; and determining the deviation between the cross section of the crane runway rail 101 and the reference rail cross section, wherein when the deviation exceeds a pre-determined threshold the runway rails 101 are not aligned, and wherein when the deviation is at or below the pre-determined threshold the runway rails 101 are aligned.

In some embodiments, the method comprises placing the measuring unit on the ground in the crane bay, optimally at the centerline of the crane bay. In some embodiments, the method further comprises collecting multiple datasets after placing the measuring unit in a plurality of positions within the crane bay. In some embodiments, the measuring unit positions are distributed along the length of the crane bay and cover different segments of the crane runway beam 102 or the crane runway rail 101. In some embodiments, the method comprises placing the measuring unit on the bridge girder 108. In some embodiments, the method comprises placing the measuring unit on the crane end carriage 103.

In some embodiments, when the measuring unit is placed on the crane bridge girder 108 or on the crane end carriage 103, the method comprises collecting multiple datasets, wherein each dataset is collected from one of a plurality of positions on the crane bridge girder 108 along the crane runway rail 101. In some embodiments, when the measuring unit is placed on the crane bridge girder 108 or on the crane end carriage 103, the method comprises collecting a dataset at every crane stop during movement of the crane bridge girder 108 along the crane runway rail 101. In some embodiments, when the measuring unit is placed on the crane bridge girder 108 or on the crane end carriage 103, the method comprises automatic activation of the measuring unit at every stop during movement of the crane bridge girder 108 along the crane runway rail 101. In some embodiments, when the measuring unit is placed on the crane bridge girder 108 or on the crane end carriage 103, the method comprises manual activation of the measuring unit at preselected positions along the crane runway rail 101. The process of collecting data at various points may be repeated until a measurement has been collected at every pre-selected survey point desired. In some embodiments, the measuring unit is placed to collect data from contiguous segments of the crane runway beam 102 or the crane runway rail 101. In some embodiments, the measuring unit is placed to collect data from overlapping segments of the crane runway beam 102 or the crane runway rail 101. In some embodiments, the data collection continues until the entire length of the crane runway beam 102 or the crane runway rail 101 has been covered.

In some embodiments, the method comprises collecting data from one of the two crane runway beams 102 or one of the two runway rails 101. In some embodiments, the method comprises collecting data from a first crane runway beam 102 or a first crane runway rail 101 followed by the collection of data from the second crane runway beam 102 or the second crane runway rail 101. In some embodiments, the method comprises collecting at least two datasets from each segment of each crane runway beam 102 or each crane runway rail 101. In some embodiments, the method comprises collecting the first dataset when the crane bridge girder 108 is positioned over the segment of the runway beam 102 or the runway rail 101 under examination and further collecting the second dataset when the crane bridge girder 108 is not positioned over the segment of the runway beam 102 or runway rail 101 under examination.

In some embodiments, the method further comprises calibrating and leveling the measuring unit before data collection. In some embodiments, the leveling of the measuring unit comprises measuring the tilt angle of the measuring unit. In some embodiments, the tilt angle is the angle between the reference plane of the support base and the plane perpendicular to the ambient gravitational force.

In some embodiments, the disclosed methods further comprise analyzing the data collected by the measuring unit as described above. In some embodiments, the methods further comprise combining the analysis outputs from the first crane runway beam 102 and the second crane runway beam 102 to measure the runway beam span variation over the length of the crane bay. In some embodiments, the methods further comprise combining the analysis outputs from the first crane runway rail 101 and the second crane runway rail 101 to measure the runway rail span variation over the length of the crane bay. In some embodiments, the data measured from the runway beams 102 and the runway rails 101 are further combined to assess the degree to which the crane track is straight. A representative result of the combined data analysis is shown in FIG. 10. In some embodiments, the methods advantageously comprise surveying the alignment of the crane runway beam 102 or the crane runway rail 101 without interrupting or suspending crane operation.

It will be appreciated that the embodiments described above and illustrated in the figures represent only a few of the many ways of collecting and analyzing rail survey data. The described methods and systems are not limited to the specific embodiments described in this document; rather, they include any system and method for the collection of overhead crane rail survey data that includes use of a rail survey carriage that is selectively pushed or pulled by the rail sweep of an overhead crane.

Conventional survey methods required upwards of 24 hours of downtime to collect data on runway rail, runway beam, and column geometries. The Konecranes USA rail rider system reduced this time to nominally 12 hours. In contrast, the disclosed rail survey system has already shown it is possible to collect all information in 4 hours.

Conventional survey methods required manpower access to the crane runway rail and runway beam. In contrast, the disclosed rail survey system has already shown it is possible to collect all information without requiring access to the crane runway rail or runway beam. Conventional survey methods also used contact measurement systems. In contrast, the disclosed rail survey system allows all measurements to be taken without contacting any of the components of the overhead crane.

Conventional survey methods generally do not take direct span measurements; rather, they generally measure one side of the crane bay and then measure the other side. They then rely on algorithms to calculate the span. The time delay in collecting the rail alignment introduces errors into the span calculations. Movement in the building structure can cause significant differences, for example, between the span calculation and the actual span distance. Sources of movement in the building structure can include thermal loading, wind loading, and crane loading from crane operations in adjacent bays. In contrast, the disclosed rail survey system directly measures the rail span and runway beam span, mitigating the deleterious effects of thermal loading, wind loading, and crane loading. Other conventional survey methods generally use a rail targeting method which introduces centering errors.

Having described preferred embodiments of the rail survey system and methods for collecting and processing rail survey data, it is believed that various modifications, improvements, substitutes, or the like will be suggested to those skilled in the art in view of the teachings set forth in this document. Therefore, it should be understood that all such modifications, improvements, substitutes, and the like are believed to fall within the scope of the disclosure. Although specific terms are used, they are used in their ordinary and accustomed manner only, unless defined differently in this document, and not for purposes of limitation.

What is claimed:

1. A non-contact rail survey system for runway beams of an overhead crane comprising:
   a plurality of crane runway beams each having an upper and a lower flange linked by a beam web and having a plurality of vertical beam web stiffeners positioned along the beam at intervals;
   a runway rail positioned on top of the runway beam;
   a hot rail positioned along the upper flange of the crane runway beam;
   a plurality of crane columns with an upper end and a lower end wherein the upper end has a beam seat upon which the crane runway beam rests;
   a measurement unit configured to remain stationary during measurement of two runway rails which collectively form a runway, the measuring unit including a 3-D laser scanner configured to collect data, a support base, and an interface which transmits the data collected by the 3D laser scanner; and
   a computing unit including a receiver which receives the 3D laser scanner data transmitted by the interface, a data storage unit, and a processor configured to compute one or more of crane rail 3D alignment, crane runway beam 3D alignment, crane runway beam flange camber, crane runway beam web warp and lean, hot rail 3D alignment, crane column 3D position and lean, crane column beam seats, and direct span measurement, wherein the measurement unit and the computing unit operate without interrupting or suspending operations of the overhead crane; a report and/or alarm is generated when at least one of crane rail 3D alignment, crane runway beam 3D alignment, crane runway beam flange camber, crane runway beam web warp and lean, hot rail 3D alignment, crane column 3D position and lean, crane column beam seats, and direct span measurement has or have a deviation that exceeds a predetermined threshold; and repairs are undertaken in response to the report and/or alarm.

2. The system according to claim 1, wherein the measurement unit is attached to a structure configured to move the measurement unit.

3. The system according to claim 2, wherein the structure comprises a wheeled carriage.

4. The system according to claim 3, wherein the wheeled carriage is powered.

5. The system according to claim 1, wherein the support base of the measurement unit is secured to a crane bridge girder.

6. The system according to claim 1, wherein the measurement unit further includes a motion sensor, a dual axis compensator configured to measure tilt, or both.

7. The system according to claim 1 wherein the processor is configured to measure crane runway beam 3D alignment by being configured to:
 (a). acquire a point cloud of a segment of a crane runway beam;
 (b). convert the point cloud into a triangulated irregular network (TIN) surface;
 (c). convert the TIN surface into a raster image;
 (d). detect edges of beam web surface segments, wherein each beam web surface segment is delineated by upper and lower runway beam flanges in the vertical dimension and by runway beam stiffeners in the horizontal dimension;
 (e). identify runway beam joints;
 (f). determine an average value of points for each beam web surface segment;
 (g). determine an average value of points between two adjacent runway beam joints;
 (h). measure the distance from each web surface segment to the crane bay centerline at the bottom, middle, and top locations along the runway beam; and
 (i). determine the deviation between: the distance from the crane bay centerline and the average value of points between two adjacent runway beam joints, and the distance from the crane bay centerline and each beam web surface segment at the top bottom and middle location,
 wherein when the deviation exceeds a pre-determined threshold the runway beams are not aligned, and wherein when the deviation is at or below the pre-determined threshold the runway beams are aligned.

8. The system according to claim 1 wherein the processor is configured to measure runway rail 3D alignment by being configured to:
 (a). acquire a point cloud of a segment of a crane runway rail;
 (b). convert the point cloud into a voxel data structure;
 (c). obtain a cross section of the runway rail;
 (d). obtain a cross section of a reference rail from a reference rail voxel data structure;
 (e). perform a fast-Fourier transform (FFT) image matching between the voxel data structure and the reference rail voxel data structure; and
 (f). determine the deviation between the cross section of the runway rail and the reference rail cross section,
 wherein when deviation exceeds a pre-determined threshold the runway rails are not aligned, and wherein when the deviation is at or below the pre-determined threshold the runway rails are aligned.

9. The system according to claim 6 wherein the receiver of the computing unit is configured to receive data from the dual axis compensator and the processor of the computing unit is configured to correct for the tilt of the measuring unit.

10. The system according to claim 9, wherein the tilt of the measuring unit is corrected by measuring a tilt angle between a reference plane of the support base and a plane perpendicular to the ambient gravitational force.

11. A non-contact method for measuring 3-D alignment of the runway beams of an overhead crane having an upper and a lower flange, linked by a beam web and having a plurality of vertical beam web stiffeners positioned along the beam at intervals, and further having a runway rail positioned on top of the runway beam, the method comprising:
 (a). providing a measurement unit configured to remain stationary during measurement of two rails which collectively form a runway, wherein the measurement unit includes a 3-D laser scanner on a support base;
 (b). acquiring a point cloud of a segment of the crane runway beam;
 (c). converting the point cloud into a triangulated irregular network (TIN) surface;
 (d). converting the TIN surface into a raster image;
 (e). detecting edges of beam web surface segments, wherein each beam web surface segment is delineated by upper and lower runway beam flanges in the vertical dimension and by runway beam stiffeners in the horizontal dimension;
 (f). identifying runway beam joints;
 (g). determining an average value of points between two adjacent runway beam joints;
 (h). determining an average value of points for each beam web surface segment;
 (i). determining an average value of points between two adjacent runway beam joints;
 (j). measuring the distance from each web surface segment to a crane bay centerline at the bottom, middle, and top locations along the runway beam; and
 (k). determining without interrupting or suspending operations of the overhead crane the deviation between: the distance from the crane bay centerline and the average value of points between two adjacent runway beam joints, and the distance from the crane bay centerline and each beam web surface segment at the top, bottom, and middle locations,
 wherein when the deviation exceeds a pre-determined threshold the runway beams are not aligned and a report and/or alarm is generated and repairs are undertaken in response to the report and/or alarm, and wherein when the deviation is at or below the pre-determined threshold the runway beams are aligned.

12. The method according to claim 11, wherein the measurement unit is positioned on the centerline of the crane bay.

13. The method according to claim 11, wherein the measurement unit is positioned on a crane bridge girder.

14. The method according to claim 13, wherein the measurement unit further includes a motion sensor and is configured to collect data automatically when the crane movement along the crane rail stops.

15. The method according to claim 11 further comprising collecting at least two datasets for each runway beam segment.

16. The method according to claim 15, wherein the first dataset is collected when the crane bridge girder is positioned over the runway beam segment under examination and the second dataset is collected when the crane bridge girder is not positioned over the runway beam segment under examination.

17. The method according to claim 11, wherein the step of detecting edges of beam web surface segments comprises detecting the edges of each web surface segment followed by dilation and erosion of edges of each web surface segment.

18. The method according to claim 11 further comprising manual addition of undetected web surface segments.

19. The method according to claim 11 further comprising generating a color map showing the deviation of the beam web surface in each segment from the average value of points for that beam web surface segment.

20. The method according to claim 11 further comprising generating a color map showing the deviation of the beam web surface in each segment from the average value of points between two adjacent runway beam joints.

21. The method according to claim 11, wherein the measuring unit further comprises a dual axis compensator and the distance from each web surface segment to a crane bay centerline is corrected for the tilt of the measuring unit.

22. The method according to claim 21, wherein the tilt of the measuring unit is corrected by measuring a tilt angle between the reference plane of the support base and the plane perpendicular to the ambient gravitational force.

23. A non-contact method for measuring 3-D alignment of the runway rails of an overhead crane, the method comprising:
  (a). providing a measurement unit configured to remain stationary during measurement of two rails which collectively form a runway, wherein the measurement unit includes a 3-D laser scanner on a support base;
  (b). acquiring a point cloud of a segment of the crane runway rail;
  (c). converting the point cloud into a voxel data structure;
  (d). obtaining a cross section of the crane runway rail;
  (e). obtaining a cross section of a reference rail from a reference rail voxel data structure;
  (f). performing a fast-Fourier transform (FFT) image matching between the voxel data structure measured in step (c) and the reference rail voxel data structure; and
  (g). determining without interrupting or suspending operations of the overhead crane the deviation between the cross section of the crane runway rail obtained in step (d) and the reference rail cross section obtained in step (e),
  wherein when the deviation exceeds a pre-determined threshold the runway rails are not aligned and a report and/or alarm is generated and repairs are undertaken in response to the report and/or alarm, and wherein when the deviation is at or below the pre-determined threshold the runway rails are aligned.

24. The method according to claim 23, wherein the measurement unit is positioned on the centerline of the crane bay.

25. The method according to claim 23, wherein the measurement unit is positioned on the crane bridge girder.

26. The method according to claim 25, wherein the measurement unit comprises a motion sensor and is configured to collect data automatically when the crane movement along the crane rail stops.

27. The method according to claim 23 further comprising collecting at least two datasets for each runway beam segment.

28. The method according to claim 27, wherein the first dataset is collected when the crane bridge girder is positioned over the runway beam segment under examination and the second dataset is collected when the crane bridge girder is not positioned over the runway beam segment under examination.

29. The method according to claim 23, wherein the measuring unit further includes a dual axis compensator and the voxel data are corrected for the tilt of the measuring unit.

30. The method according to claim 29, wherein the tilt of the measuring unit is corrected by measuring a tilt angle between the reference plane of the support base and the plane perpendicular to the ambient gravitational force.

31. The method according to any of the claims 11 to 30, wherein the crane is operational while data are being collected.

* * * * *